United States Patent

Gross-Petersen

(10) Patent No.: US 10,364,661 B2
(45) Date of Patent: Jul. 30, 2019

(54) SYSTEM AND A METHOD FOR SEPARATING LIQUID AND GAS FLOWING THROUGH A MULTIPHASE PIPELINE

(71) Applicant: Maersk Olie og Gas A/S, Copenhagen K (DK)

(72) Inventor: Jørgen Gross-Petersen, Virum (DK)

(73) Assignee: TOTAL E&P DANMARK A/S, København Ø (DK)

( * ) Notice: Subject to any disclaimer, the term of this patent is extended or adjusted under 35 U.S.C. 154(b) by 197 days.

(21) Appl. No.: 14/422,963

(22) PCT Filed: Aug. 22, 2013

(86) PCT No.: PCT/EP2013/067485
§ 371 (c)(1),
(2) Date: Feb. 20, 2015

(87) PCT Pub. No.: WO2014/029854
PCT Pub. Date: Feb. 27, 2014

(65) Prior Publication Data
US 2015/0233227 A1    Aug. 20, 2015

Related U.S. Application Data

(66) Substitute for application No. 61/692,037, filed on Aug. 22, 2012.

(30) Foreign Application Priority Data

Aug. 22, 2012   (DK) .................................. 2012 70497

(51) Int. Cl.
*B01D 19/00*     (2006.01)
*E21B 43/36*     (2006.01)
(Continued)

(52) U.S. Cl.
CPC .......... *E21B 43/36* (2013.01); *B01D 19/0063* (2013.01); *B01D 19/0073* (2013.01);
(Continued)

(58) Field of Classification Search
CPC   B01D 19/00; B01D 19/0063; B01D 19/0073; E21B 43/36; E21B 17/01–017;
(Continued)

(56) References Cited

U.S. PATENT DOCUMENTS 4,589,434 A *   5/1986   Kelley ................... E21B 43/01
                                                        137/1
2003/0170077 A1   9/2003   Herd et al.
(Continued)

FOREIGN PATENT DOCUMENTS

GB           2468973 A        9/2010
WO       2008140319 A1       11/2008
(Continued)

OTHER PUBLICATIONS

International Search Report and Written Opinion for PCT:EP2013:067485, dated Sep. 27, 2013.
(Continued)

*Primary Examiner* — T. Bennett McKenzie
(74) *Attorney, Agent, or Firm* — Brinks Gilson & Lione

(57) ABSTRACT

A system for separating liquid and gas flowing through a multiphase pipeline, said system comprising: A riser (8) having an upper end (2) and a lower end (10), said riser being at its lower end configured to receive fluid from said multiphase pipeline (4) and having means for delivering (5) of gas at its upper end, said riser further comprising valve means (6) for adjusting the flow at which the gas is delivered through the upper end of said riser; a pipe (7) to be arranged outside or inside the riser, said pipe having an upper part (3) and a lower part (9), where the lower part is connected to or
(Continued)

inserted into the riser, thereby creating a liquid flow path between the riser and the lower part of the pipe, said pipe having a liquid intake (11) configured to receive liquid from a liquid column in said riser, and said upper end of said pipe being configured to deliver said liquid, said pipe further comprising means for adjusting the flow at which said liquid is delivered through the upper end of said pipe; level measuring means adapted for measuring the position of a surface (18) of said liquid column in said riser; control means capable of controlling said valve means, such that the position of the surface of said liquid column can be adjusted by adjusting the flow at which gas/liquid is delivered via said liquid flow path and through the upper end of said riser and/or said lower part (9) of said pipe (7).

14 Claims, 2 Drawing Sheets

(51) Int. Cl.
 *E21B 43/01* (2006.01)
 *E21B 43/12* (2006.01)
 *E21B 17/01* (2006.01)
(52) U.S. Cl.
 CPC .............. *E21B 17/01* (2013.01); *E21B 43/01* (2013.01); *E21B 43/12* (2013.01)

(58) Field of Classification Search
 CPC .............. E21B 17/085; E21B 21/06–07; E21B 43/01–017; E21B 43/12–129
 USPC .......................................................... 95/1–24
 See application file for complete search history.

(56) References Cited

U.S. PATENT DOCUMENTS

| | | | |
|---|---|---|---|
| 2003/0205384 A1* | 11/2003 | Lush | ...................... E21B 43/01 166/357 |
| 2006/0150749 A1 | 7/2006 | Eken et al. | |
| 2009/0088987 A1* | 4/2009 | Lyon | ................... G01F 23/0061 702/54 |
| 2010/0307598 A1 | 12/2010 | Cao et al. | |
| 2012/0199000 A1* | 8/2012 | Elms | .................. B01D 19/0057 95/258 |

FOREIGN PATENT DOCUMENTS

| | | |
|---|---|---|
| WO | 2010080040 A1 | 7/2010 |
| WO | 2011073203 A1 | 6/2011 |

OTHER PUBLICATIONS

Danish search report for PA 2012 70497, completed Apr. 5, 2013.
International-Type search report for Application No. 201270497, completed Apr. 30, 2013.

* cited by examiner

SYSTEM AND A METHOD FOR SEPARATING LIQUID AND GAS FLOWING THROUGH A MULTIPHASE PIPELINE

RELATED APPLICATIONS

This application claims the benefit under 35 U.S.C. § 371 of International Patent Application No. PCT/EP2013/067485, having an international filing date of Aug. 22, 2013, which claims priority to Danish Application No. PA 2012 70497, filed Aug. 22, 2012, and U.S. Provisional Application No. 61/692,037, filed Aug. 22, 2012, the contents of all of which are incorporated herein by reference in their entirety.

BACKGROUND

The invention relates to a system for separating liquid and gas flowing through a multiphase pipeline, said system comprising: A riser having an upper end and a lower end, said riser being at its lower end configured to receive fluid from said multiphase pipeline and having means for delivering of gas at its upper end, said riser further comprising valve means for adjusting the flow at which the gas is delivered through the upper end of said riser.

DESCRIPTION OF RELATED ART

Risers are used to connect subsea pipelines with platform process facilities. Risers for incoming pipelines operating with free gas such as multiphase flow pipelines or wet gas pipelines are known to slug when lifting the liquid from the pipeline up to the riser due to the back-pressure imposed by the riser to the pipeline when lifting the pipeline contents up from the pipeline.

This phenomenon is called riser slugging and is a regular flow where alternating liquid or gas flows up through the riser. Riser slugging typically takes place at lower flow rates in the multiphase pipeline and is worse for pipelines sloping down to a riser than for a pipeline sloping up to a riser. It is not always easy to increase the flow rates to solve the slugging as the increased flow rate would require an increased pressure drop over the pipeline which may not be available or which may be very costly to arrange by pumps and or by compressors.

Such regular riser slugging is a short frequency phenomenon. Other types of slugging also exist such as terrain-induced slugging due to lateral undulations of the pipeline, throughput changes of a pipeline, slugging during start-up of a pipeline and slugging in connection with pigging operations. The latter three are transient phenomena and are normally handled by throttling of the outflow from the pipeline. Terrain slugging may also occur regularly, but normally have much higher frequencies than riser slugging. Terrain slugging may, as is the case for the transient slugging, only be handled by throttling of the outlet from the pipeline when required. Terrain slugging is less common than riser slugging.

There are many applications in which fluid is required to flow through conduits which include pipelines and risers, but perhaps one of the most challenging applications is the extraction of fluid under relatively low pressures from wells in the gas and oil industry. In the case of wells located on a seabed, there may be a considerable height from the base of the riser to the processing facilities above the sea surface. Low pressures are typically present where a well is nearing the end of its useful life, a so-called brown oil field, and under such conditions it is common for the flow of fluid in a riser pipeline to give rise to slug flow.

Slug flow is troublesome to offshore oil production systems, because it leads to sudden and generally cyclical surges in the flow of liquid (e.g. oil) and gas from the riser pipeline to subsequent processing apparatus located topside of the pipeline, resulting in reduced production, e.g. downstream of the top of the pipeline. Because of the problems of slug flow, wells are often considered to have reached the end of their useful life some time before they are exhausted, simply because of the low pressures which give rise to troublesome slug flows.

Many attempts have been made to prevent the formation of slug flow in order to make it viable to extract from low pressure wells (the problem also occurs with high pressure wells but is less prominent). Known solutions focus on active control of the flow by opening and closing a control valve, or choke valve, located at the topside of the riser pipeline.

From GB2468973 is known a method, a controller and a system for controlling the slug flow of a multiphase fluid comprising gas and liquid in a conduit, such as a riser pipeline, the pipeline being provided with a control valve with a variable aperture which enables the conduit to be constricted. The method, controller and system may be arranged to prevent the excessive growth of slug flow by choking the flow by varying the aperture of the valve.

BRIEF SUMMARY

It is an object of the present invention both to suppress regular riser slugs and to mitigate other types of slugging by providing an improved system for separating liquid and gas flowing through a multiphase pipeline.

The objects of the invention are achieved by a pipe to be arranged outside or inside the riser, said pipe having an upper part and a lower part with the lower part being connected to or inserted into the riser, thereby creating a liquid flow path between the riser and the lower part of said pipe having a liquid intake configured to receive liquid from a liquid column in said riser, and said upper end of said pipe being configured to deliver said liquid, said pipe further comprising means for adjusting the flow at which said liquid is delivered through the upper end of said pipe; level measuring means adapted for measuring the position of a surface of said liquid column in said riser, and control means capable of controlling said valve means, such that the position of the surface of said liquid column can be adjusted by adjusting the flow at which gas/liquid is delivered via said liquid flow path and through the upper end of said riser and/or said lower part of said pipe.

In another embodiment the invention relates to a method of separating liquid and gas flowing through a multiphase pipeline.

Embodiments of the invention are recited in the dependent claims.

In the description, the words riser and caisson are used to describe the same technical feature.

An embodiment of the present invention will now be described with reference to and as illustrated in the accompanying drawings of which:

BRIEF DESCRIPTION OF THE SEVERAL VIEWS OF THE DRAWING(S)

DETAILED DESCRIPTION

Figure 1:
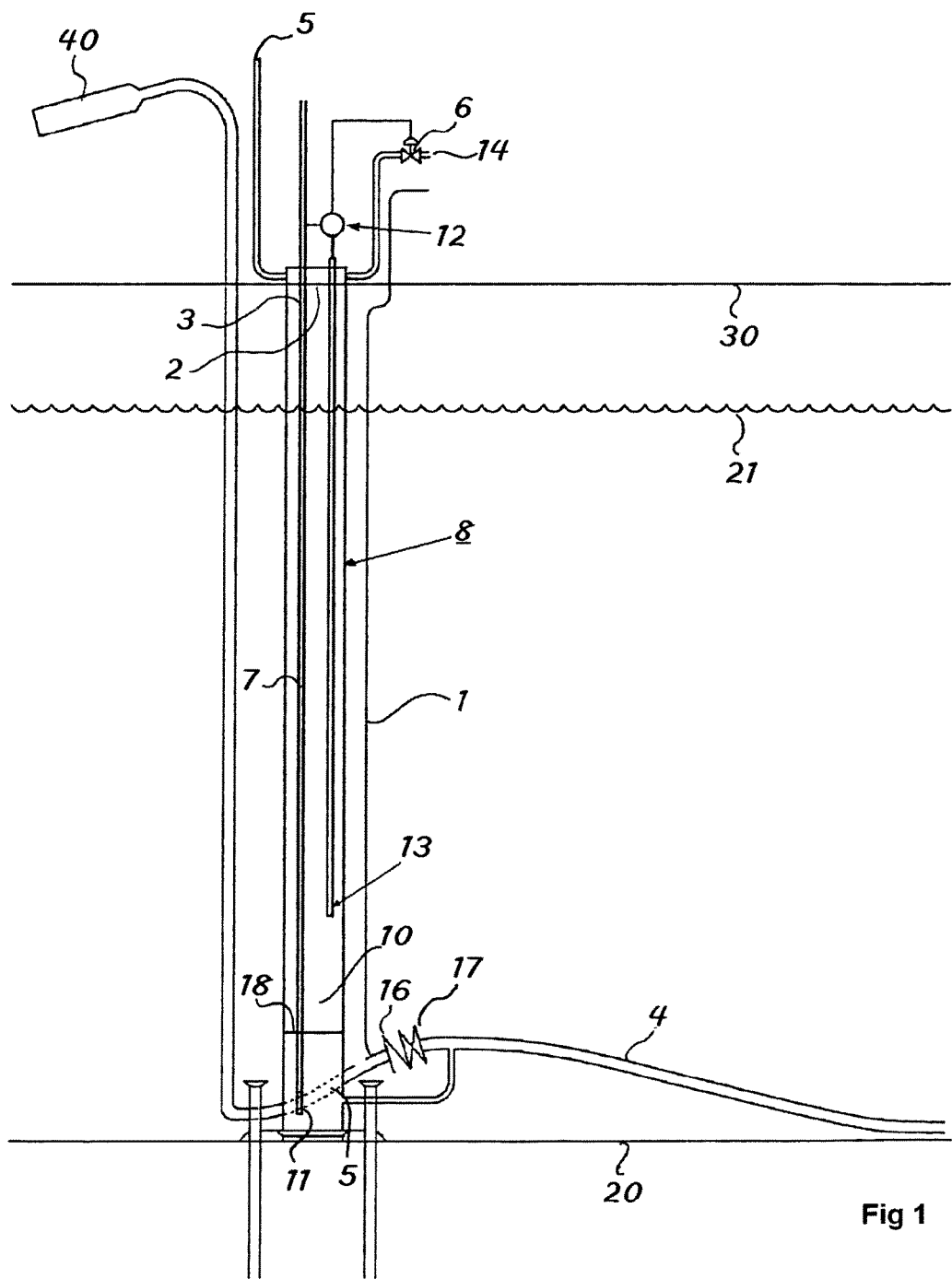
FIG. 1 is an illustration of a slug free riser provided with a liquid level control by differential pressure to drive the liquid out from the riser and without any active devices inside the riser.

In FIG. 1 is shown an example of a system for extraction of gas and oil from a pipeline (4) connected to a caisson or riser (8). The riser (8) is at its upper end (2) connected to means (5, 14) for delivery of gas. At its lower end the riser is connected to the pipeline (4) across the seabed (20).

Above the seabed is shown sea level (21) and deck level (30).

The pipeline (4) is a multiphase pipeline in which a mixture of liquid and gas is flowing. The pipeline (4) is provided with a non-return valve (16) and a block valve (17) before entering the riser (8).

Gas and liquid separate at the bottom of the riser (10, also called the separation section) near the multiphase pipeline connection, and a first flow path is running from below the liquid surface to the top of the riser through the internal of a pipe (7) for delivery of liquid. The pipe (7) inside the riser (8) as shown in FIG. 1 is the liquid outlet from the riser. The interface (18) between liquid and gas is shown at the bottom of the riser.

The flow at which the gas is delivered at the upper end of the riser is controlled by a valve (6).

The pipe (7) has an upper part (3) and a lower part (9) and is arranged inside the riser and is thereby creating a second flow path. The second flow path, for delivery of the gas from the top of the riser (14), is running in the space between the pipe (7) and the riser (8). The lower part of the pipe (7) is provided with one or more openings (11), such that liquid can enter the pipe. The liquid can then be lifted up through the pipe (7) by the gas pressure in the riser.

The column of liquid inside the riser (8) will rise or fall until its weight is in equilibrium with the pressure differential between the inlet (opening at the bottom end of the pipe) and the top of the riser (the weight of the gas is considered to be negligible). By measuring of the pressure differential (12) between the liquid outlet and the pressure at the top of the riser, and thereby the liquid level in the riser (8) and knowledge of fluid characteristics as specific density, it is thus possible to calculate/estimate the height of the column of liquid.

In the embodiment shown in FIG. 1, a differential pressure gauge (12) is mounted, so that the pressure between the pipe and the top of the riser can be measured. By furthermore providing the system with pressure regulating means and a controlling device, it is possible to regulate the pressure in the riser (above the surface of the liquid column) and also to control and regulate the position of the liquid surface.

In the embodiment shown in FIG. 1, the gas pressure in the riser is regulated through a valve (6) and controlled via a liquid gauge unit (13) inside the riser (8),In this way the riser (or caisson) can act as a two-phase riser and separate the gas and the liquid when entering .

However, the position of the surface of the column of liquid can also be determined in other ways, such as, for example, by means of ultrasound. The constant low liquid level in the riser (8) does not provide any back-pressure to the pipeline (4), and thereby riser slugs will not be formed, and the multiflow pipeline will flow steadily into the riser.

Regular riser slugging is therefore suppressed.

Other types of slugging will still occur, but will be mitigated by the separation in the riser, which no longer generates any back-pressure to the pipeline. Throttling of inflow may still be required to prevent overloading of the capacity of the system.

Figure 2:
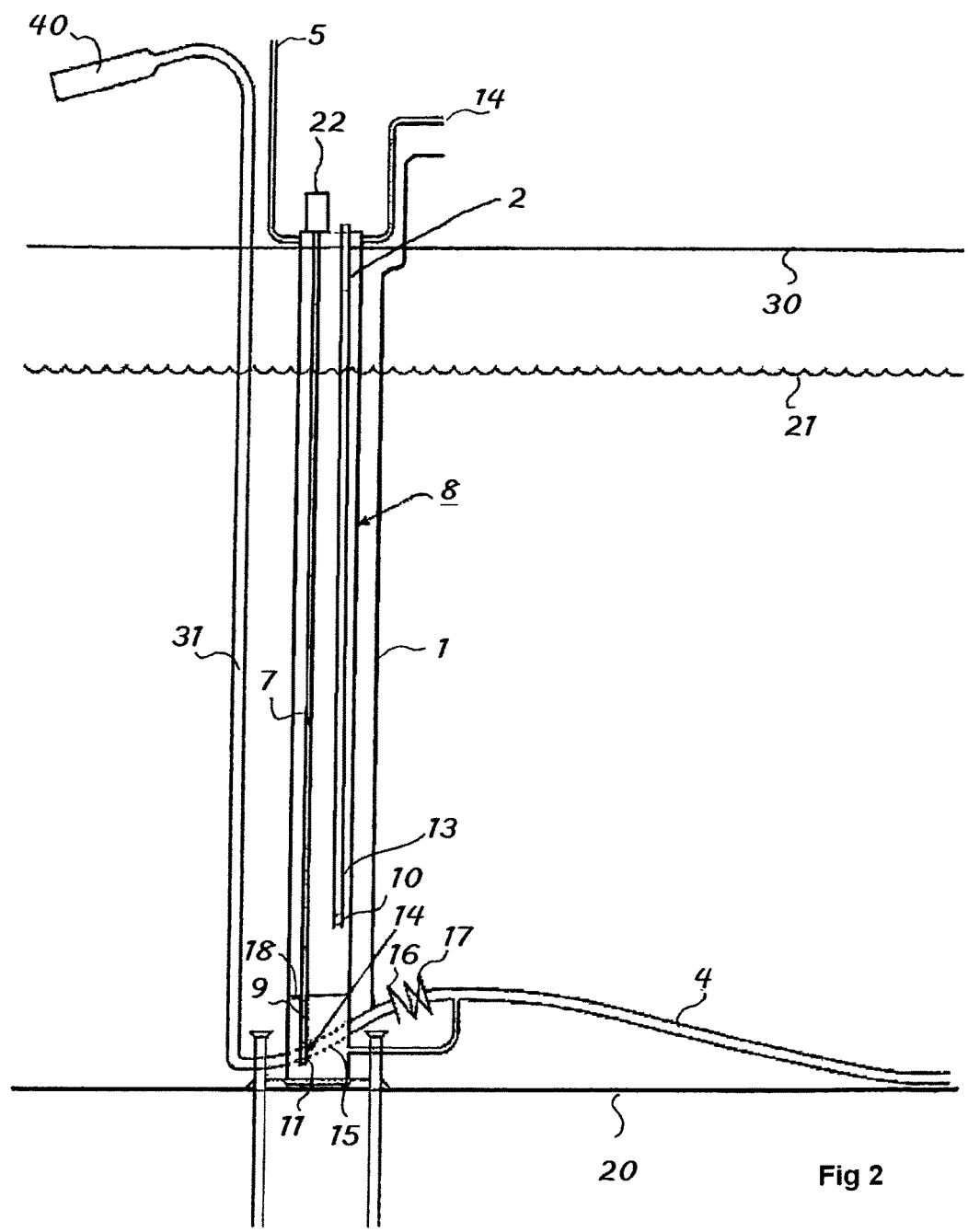
FIG. 2 is an illustration of a slug free riser being provided with a submersible pump to extract the liquid.

Another embodiment of the invention is shown in FIG. 2. In this embodiment the liquid is pumped up from the riser via the pipe (7), while the gas is taken off at the top of the riser (14). The pump may be a submersible pump situated at the lower end of the pipe (9) and being in fluid communication with the liquid separated out at the bottom of the riser (10). Furthermore, the pump may be controlled by a liquid level gauge. For example, the liquid gauge may correspond to a radar-type gauge. The liquid gauge may correspond to a nucleonic level sensor positioned within the riser. The liquid gauge may correspond one ultrasonic level sensor positioned within the riser. Other liquid gauges may be utilized. A differential measurement (12, only shown in FIG. 1) may also be used to control the pump.

In one embodiment, the liquid lift pump and the instrumentation for operation are installed from the top of the riser, and therefore also retrievable in normal operation. Also the liquid level gauge is retrievable from the top of the riser through the lubricator (22). The pump may be retrieved through the lubricator while the riser is in operation.

The system is, in one embodiment, provided with means for retrieval of a pig.

A pig is a commonly known feature which is sent through pipelines to e.g. clean or test the inside, or to act as a barrier. A pig which has passed through the pipeline (4) can be lifted to the surface by use of the arrangement shown in FIG. 1 and FIG. 2. The pipeline (4) is, in the shown embodiment, provided with a downwardly sloping part (15). The sloping part (15) is provided with openings (shown as small dots in the figures) in that part of it, where it is passing through the riser. However, the sloping part of the pipeline continues beyond the riser, such that a pig (not shown) which has been sent through the pipeline (4) will end in this part. The pipeline is furthermore provided with sensors (not shown in the figures), such that it can be verified that the pig has passed the non-return valve 16 and has entered the riser for the pig retrieval (31), and the pig can then be lifted up to the receiver (40) by gas or by crude oil through a pig lift line (1), by which gas (or oil) can be pumped into the pipeline (4) after the non-return valve (17). It is also possible to lift the pig to the surface by increasing the pressure in the riser and therefore also behind the pig.

The invention claimed is:

1. A system for separating liquid and gas flowing through a multiphase pipeline, said system comprising:

a riser for connection to a sub-sea pipeline with an above sea-surface process facility, said riser having an upper end and a lower end, said riser being at its lower end configured to receive fluid from said multiphase pipeline and being configured at its upper end to receive gas which is delivered thereto, said riser further comprising a valve for adjusting the flow at which the gas is delivered through the upper end of said riser;

a pipe to be arranged outside or inside the riser, said pipe having an upper part and a lower part with the lower part being connected to or inserted into the riser, thereby creating a liquid flow path between the riser and the pipe, said pipe having a liquid intake configured to receive liquid from a liquid column in said riser during production operations, and said upper end of said pipe being configured to deliver said liquid, said pipe further comprising for a valve adjusting the flow at which said liquid is delivered through the upper end of said pipe;

one or more gauges configured to measure the position of a surface of said liquid column in said riser;

a controller configured to control said valve for adjusting the flow at which the gas is delivered through the upper end of said riser means such that the position of the surface of said liquid column can be adjusted by adjusting the flow at which gas is delivered through the upper end of said riser; and wherein the one or more gauges include a first pressure gauge configured to measure the pressure at said upper end of said pipe and a second pressure gauge configured to measure the pressure in the liquid flow path between the riser and said pipe at the upper end of said pipe, wherein during production operations the controller is configured to compare the pressures measured by the first pressure gauge and the second pressure gauge to thereby estimate the position of the surface of said liquid column in said riser.

2. The system according to claim 1, wherein the one or more gauges include a nucleonic level sensor to be positioned within the riser.

3. The system according to claim 1, wherein the one or more gauges include at least one radar level sensor to be positioned within the riser.

4. The system according to claim 1, wherein the one or more gauges include at least one ultrasonic level sensor positioned within the riser.

5. The system according to claim 1 wherein the one or more gauges include a differential pressure sensor configured to measure pressure difference between the pressure in said annular space and said pipe, wherein the controller is further configured to calculate the position of the surface of said liquid column in said riser based on the measured pressure difference.

6. The system according to claim 1 comprising a lift line to force a pig to a pig receiver.

7. The system according to claim 1, further comprising a pump configured to evacuate liquid from the riser via said pipe.

8. The system according to claim 7, where the controller is further configured to regulate said pump, such that the position of the surface of said column of liquid can be adjusted by regulating the pump and adjusting the flow at which gas is delivered via said annular space and through the upper end of said riser.

9. The system according to claim 1, further comprising an additional riser for pig retrieval.

10. The system according to claim 2, wherein the one or more gauges include at least one radar level sensor to be positioned within the riser.

11. The system according claim 2, wherein the one or more gauges include at least one ultrasonic level sensor positioned within the riser.

12. The system according claim 2, wherein the one or more gauges include a differential pressure sensor configured to measure pressure difference between the pressure in said annular space and said pipe, wherein the controller is further configured to calculate the position of the surface of said liquid column in said riser based on the measured pressure difference.

13. The system according to claim 2 comprising a lift line to force a pig to a pig receiver.

14. The system according to claim 2, further comprising a pump configured to evacuate liquid from the riser via said pipe.

* * * * *

UNITED STATES PATENT AND TRADEMARK OFFICE
CERTIFICATE OF CORRECTION

Page 1 of 1

PATENT NO.        : 10,364,661 B2
APPLICATION NO.   : 14/422963
DATED             : July 30, 2019
INVENTOR(S)       : Jørgen Gross-Petersen It is certified that error appears in the above-identified patent and that said Letters Patent is hereby corrected as shown below:

On the Title Page

In (71) Applicant, delete "Maersk Olie og Gas A/S, Copenhagen K (DK)" and replace with
--TOTAL E&P DANMARK A/S, KØBENHAVN Ø (DK)--

Signed and Sealed this
First Day of December, 2020

Andrei Iancu
*Director of the United States Patent and Trademark Office*